(12) United States Patent
Tredoux et al.

(10) Patent No.: US 9,369,528 B2
(45) Date of Patent: Jun. 14, 2016

(54) MULTI-FUNCTION DEVICE APPLICATION CATALOG WITH INTEGRATED DISCOVERY, MANAGEMENT, AND APPLICATION DESIGNER

(71) Applicants: Gavan L. Tredoux, Penfield, NY (US); Shiv Singh Kansingh, Webster, NY (US); Roger T. Kramer, Rochester, NY (US); Premkumar Rajendran, Webster, NY (US); James M. Sweet, Rochester, NY (US); Saurabh Prabhat, Webster, NY (US); Richard Steven Born, Fairport, NY (US); Andrew T. Martin, Honeoye Falls, NY (US); Brandon Scott McComber, Webster, NY (US); Khalid Rabb, Fairport, NY (US); Myriam Martinez, Rochester, NY (US); Arun Bakthavachalu, Webster, NY (US)

(72) Inventors: Gavan L. Tredoux, Penfield, NY (US); Shiv Singh Kansingh, Webster, NY (US); Roger T. Kramer, Rochester, NY (US); Premkumar Rajendran, Webster, NY (US); James M. Sweet, Rochester, NY (US); Saurabh Prabhat, Webster, NY (US); Richard Steven Born, Fairport, NY (US); Andrew T. Martin, Honeoye Falls, NY (US); Brandon Scott McComber, Webster, NY (US); Khalid Rabb, Fairport, NY (US); Myriam Martinez, Rochester, NY (US); Arun Bakthavachalu, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 121 days.

(21) Appl. No.: 13/858,671

(22) Filed: Apr. 8, 2013

(65) Prior Publication Data

US 2014/0304333 A1   Oct. 9, 2014

(51) Int. Cl.
*G06F 15/16* (2006.01)
*H04L 29/08* (2006.01)

(52) U.S. Cl.
CPC .............. *H04L 67/125* (2013.01); *H04L 67/16* (2013.01); *H04L 67/34* (2013.01)

(58) Field of Classification Search
USPC .......................................................... 709/219
See application file for complete search history.

(56) References Cited

U.S. PATENT DOCUMENTS

| | | | | |
|---|---|---|---|---|
| 8,099,332 B2* | 1/2012 | Lemay | ...................... | G06F 8/61 705/26.1 |
| 8,234,692 B2* | 7/2012 | Cortes | .................... | G06Q 10/06 726/1 |
| 8,619,297 B2* | 12/2013 | K | .......................... | G06F 3/1204 358/1.15 |
| 8,751,321 B2* | 6/2014 | Lemay | ...................... | G06F 8/61 705/26.1 |
| 8,788,944 B1* | 7/2014 | Gill | .......................... | G06F 8/61 715/744 |
| 8,983,534 B2* | 3/2015 | Patel | ...................... | G08C 17/02 340/5.25 |

(Continued)

*Primary Examiner* — Alicia Baturay
(74) *Attorney, Agent, or Firm* — MH2 Technology Law Group LLP

(57) ABSTRACT

Systems, methods, and computer-readable media for managing extensibility, e.g., on a network of multi-function devices are provided. The system includes an application catalog, in communication with an application database of a catalog server and configured to load applications therefrom. The system also includes a device manager configured to discover one or more devices on a network and to allow selection of one or more selected devices from among the one or more devices. The system further includes a data transfer system in communication with the one or more devices and to cause an application to be transmitted from the application catalog to the one or more selected devices, such that the one or more selected devices receive the application without communicating directly with the application database.

17 Claims, 5 Drawing Sheets

(56) References Cited

U.S. PATENT DOCUMENTS

| | | | |
|---|---|---|---|
| 9,055,077 B2* | 6/2015 | Lindley | G06F 21/6245 |
| 2003/0145096 A1* | 7/2003 | Breiter | H04L 29/06 |
| | | | 709/231 |
| 2005/0198284 A1* | 9/2005 | Bunn et al. | 709/225 |
| 2006/0253824 A1* | 11/2006 | Iizuka | G06F 11/0751 |
| | | | 716/119 |
| 2007/0250605 A1* | 10/2007 | Duchene et al. | 709/220 |
| 2007/0273920 A1* | 11/2007 | Galmes | G06F 3/1205 |
| | | | 358/1.15 |
| 2007/0283001 A1* | 12/2007 | Spiess | H04L 12/2602 |
| | | | 709/224 |
| 2007/0298779 A1* | 12/2007 | Wolman | H04L 43/12 |
| | | | 455/423 |
| 2008/0079975 A1* | 4/2008 | Ferlitsch | H04L 67/16 |
| | | | 358/1.13 |
| 2008/0133683 A1* | 6/2008 | Ki-Sook | H04L 67/322 |
| | | | 709/206 |
| 2008/0246985 A1* | 10/2008 | Patwardhan | G06F 3/1204 |
| | | | 358/1.15 |
| 2009/0097397 A1* | 4/2009 | Moreira Sa de Souza | H04L 41/0636 |
| | | | 370/216 |
| 2009/0172635 A1* | 7/2009 | Auriemma | G06F 8/36 |
| | | | 717/107 |
| 2009/0193132 A1* | 7/2009 | Plewnia | G06F 9/5027 |
| | | | 709/230 |
| 2009/0282150 A1* | 11/2009 | Iwasaki | G06F 9/5038 |
| | | | 709/226 |
| 2010/0223632 A1* | 9/2010 | Regnier | G06F 9/5055 |
| | | | 719/328 |
| 2010/0281392 A1* | 11/2010 | Allyn et al. | 715/744 |
| 2011/0010759 A1* | 1/2011 | Adler | G06F 21/10 |
| | | | 726/4 |
| 2012/0030573 A1* | 2/2012 | Balko | G06F 9/4426 |
| | | | 715/735 |
| 2012/0130886 A1* | 5/2012 | Shergill | G06Q 30/2017 |
| | | | 705/39 |
| 2012/0194851 A1* | 8/2012 | Srinivasmurthy K | G06F 3/1204 |
| | | | 358/1.15 |
| 2012/0307267 A1* | 12/2012 | Blanchard, Jr. | H04N 1/46 |
| | | | 358/1.9 |
| 2012/0311548 A1* | 12/2012 | Ko | G06F 8/70 |
| | | | 717/140 |
| 2013/0060928 A1* | 3/2013 | Shao | G06F 9/5072 |
| | | | 709/223 |
| 2013/0066939 A1* | 3/2013 | Shao | H04L 67/1025 |
| | | | 709/201 |
| 2013/0066940 A1* | 3/2013 | Shao | H04L 67/1025 |
| | | | 709/201 |
| 2013/0095785 A1* | 4/2013 | Sadana et al. | 455/406 |
| 2013/0268926 A1* | 10/2013 | Colelli | G06F 9/445 |
| | | | 717/174 |
| 2013/0339454 A1* | 12/2013 | Walker | H04L 51/04 |
| | | | 709/206 |
| 2014/0073420 A1* | 3/2014 | Matthew | 463/29 |
| 2014/0204403 A1* | 7/2014 | Young | G06F 3/1293 |
| | | | 358/1.14 |
| 2014/0226171 A1* | 8/2014 | Tredoux | H04N 1/00225 |
| | | | 358/1.13 |
| 2014/0282480 A1* | 9/2014 | Matthew | G06F 8/65 |
| | | | 717/172 |

* cited by examiner

MULTI-FUNCTION DEVICE APPLICATION CATALOG WITH INTEGRATED DISCOVERY, MANAGEMENT, AND APPLICATION DESIGNER

FIELD OF THE DISCLOSURE

The present disclosure relates generally to systems and methods for controlling and managing devices, e.g., multi-function devices.

BACKGROUND

Special-purpose computing devices, for example, multi-function devices (e.g., printing centers), smartphones, etc., benefit from access to libraries of applications. These applications may provide extensibility options for the computing devices, enabling them to perform one or more additional functions or to improve performance of current functions as new applications are developed. The libraries may be centrally located or may be distributed among a plurality of devices, for example, in peer-to-peer sharing. Loading such applications to the devices typically proceeds by each individual device accessing the application library and downloading the application whether automatically or manually. In large systems, e.g., commercial fleets, this may be time consuming and may present issues since different devices of the fleet have different hardware capabilities, operating systems, etc.

Furthermore, such extensibility in a commercial fleet may present a security risk. Allowing the computing devices to be modified by accessing a library may provide an opportunity to access and/or modify the computing device in ways not intended by the network administrator. Accordingly, in many environments, the extensibility, at least when the devices of the fleet are deployed, is disabled. Thus, to update or provide new functionality to the device, in some cases, a service operator is required to physically access the device and enable the extensibility features, which may further add to delay and expense involved with increasing or adding functionality to the devices. Moreover, maintaining the database and relying on local operators to update the system may result in an inconsistent deployment of extensibility applications across the fleet.

Additionally, the development, management, and deployment of such extensibility applications are typically provided by distinct systems. For example, an application may be developed in a development studio and loaded into an application database, which may then be accessed and loaded into various devices on a network. However, this requires the interaction of several different systems, which may be cumbersome for a variety of different reasons, including compatibility issues.

SUMMARY

Embodiments of the disclosure may provide an integrated extensibility management system. The system includes an application catalog, in communication with an application database of a catalog server and configured to load applications therefrom. The system also includes a device manager configured to discover one or more devices on a network and to allow selection of one or more selected devices from among the one or more devices. The system further includes a data transfer system in communication with the one or more devices and to cause an application to be transmitted from the application catalog to the one or more selected devices, such that the one or more selected devices receive the application without communicating directly with the application database.

Embodiments of the disclosure may further provide a computer-implemented method for managing applications. The method includes discovering one or more devices on a network using a device manager of a management system, and selecting at least one of the one or more devices using a user interface of the management system, with the user interface communicating with the device manager. The method also includes receiving an application from a catalog server using an application catalog of the management system. The method further includes selecting the application from the application catalog of the management system, and deploying the application that is selected to the one or more devices without requiring that the one or more devices directly communicate with the catalog server.

Embodiments of the disclosure may also provide a computer-readable medium storing instructions that, when executed by a processor, are configured to cause a device management system to perform operations. The operations include discovering one or more devices on a network using a device manager of a management system, and selecting at least one of the one or more devices using a user interface communicating with the device manager. The operations also include receiving an application from a catalog server using an application catalog of the management system. The operations further include selecting the application from the application catalog of the management system, and deploying the application that is selected to the one or more devices without requiring that the one or more devices directly communicate with the catalog server.

It is to be understood that both the foregoing general description and the following detailed description are exemplary and explanatory only and are not restrictive of the present teachings, as claimed.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings.

Figure 1:
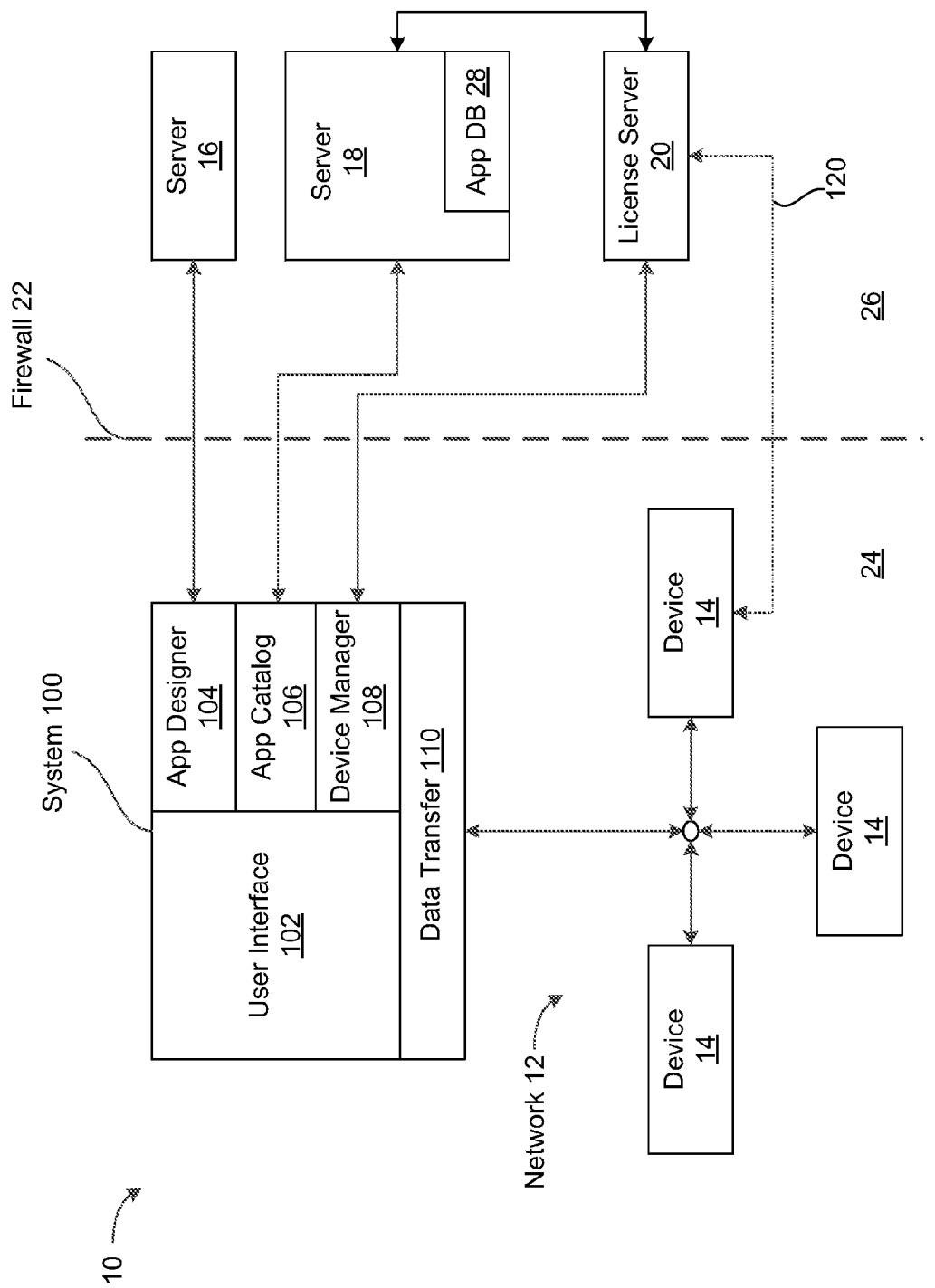
FIG. 1 illustrates a conceptual schematic view of a network environment including an integrated extensibility management system, according to an embodiment.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

Generally, embodiments of the present disclosure provide an integrated system for designing applications, managing devices, for example, a network of multi-function devices (e.g., printing devices), and deploying extensibility applications thereto. The system may provide an application designer, which facilitates development of extensibility applications. Further, the system may provide an application catalog, which may interface with an "application store" (e.g., a hosted external catalog of applications developed by the system manufacturer or a third party, such as an application vendor). The application catalog may thus contain applications purchased or otherwise downloaded from the application store, developed in the application designer, and/or applications loaded from other sources (e.g., flash drives, disks, etc.).

The system may further include a device manager, which allows for discovery, e.g., automatic discovery, of devices on the network and deployment of applications thereto. Such deployment may avoid a requirement for each of the devices to have access to the application store or, in some cases, even the application catalog on the system. Instead, the device manager may allow remote access to the devices, and allow the system to cause the devices to download applications or even to access an external download point. The device manager may also enable the grouping and/or selection of individual devices, the harvesting of information (e.g., serial number, network address, etc.) therefrom, and the like.

Turning now to the specific, illustrated embodiments, FIG. 1 depicts a conceptual schematic view of a network environment 10, according to an embodiment. The network environment 10 may include a network 12 of devices 14, and an integrated extensibility control system 100, according to an embodiment. The network 12 may be any suitable network with any structure, e.g., star, ring, tree, etc., with the devices 14 connected to and through the network 12 using any framework. Further, the network 12 need not be located in one particular geographical area, but may be distributed or remote, e.g., via a cloud or the like. The devices 14 may be or include multi-function devices, which may include special-purpose computers, printers, scanners, copiers, networking hardware, input/output peripherals, etc., which may or may not be packaged as a single unit.

The network environment 10 may also include a plurality of servers (three shown: 16, 18, 20). In at least one embodiment, the servers 16-20 are provided via a cloud computing environment, the internet, a local area network, or the like. The servers 16-20 may be representative of different computing devices or different portions of a single computing device. In some cases, the servers 16-20 may be physically remote from the system 100. Further, the servers 16-20 may be separated from the network environment 10 and/or the network 12 using a firewall 22, which conceptually partitions the network environment 10 into a protected, network side 24 and an external or cloud side 26, restricting access therebetween in any suitable manner. In some embodiments, the devices 14 may be prevented from communicating with servers or other devices that are not on the network side 24 of the firewall 22. In another embodiment, the servers 16-20 may be representative of one or more portions of one or more computers, e.g., functions, databases, etc. provided by a desktop computer or server of the network 12.

Referring specifically now to the system 100, the system 100 may include a user interface 102, which may receive input and display output. One example implementation for the user interface 102 is a web browser, which may be configured to employ HTML, Javascript, CSS/XSLT, or any other programming language known in the art. Further, the user interface 102 may provide access to an Enterprise Information Portal for communication with the devices 14.

The system 100 may also include an application designer 104, an application catalog 106, and a device manager 108. In an embodiment, the system 100 may integrate the functions, as will be described in greater detail below, of the application designer 104, the catalog 106, and the device manager 108 such that two or more are usable through a single instance of the user interface 102, e.g., on a single display (although the display may be visible on several screens). As such, embodiments of the system 100 may be referred to as "integrated."

In an embodiment, the application designer 104 may communicate with the user interface 102 to allow a user to create custom applications. The application designer 104 may also communicate with the server 16, which may be a "design" server 16. In one embodiment, the application designer 104 may provide simplified front-end access to the design server 16. The design server 16 may then serve as the back-end engine, converting the information received from the application designer 104, compiling an application based on the information, and returning the application to the system 100. For example, the application designer 104 may communicate with the user via the user interface 102 and query the user regarding the desired functionality of a custom application. Once the information for the custom application is received, the application designer 104 may communicate the harvested information to the design server 16. The design server 16 may, in turn, generate the application, e.g., according to rules, code, function libraries, etc., pre-determined for the available functionality of the custom application. The design server 16 may then send the custom application back to the system 100 for deployment to the network 12. In other embodiments, the application designer 104 or another component of the system 100 may generate the custom application without requiring communication with an external server.

In another embodiment, the application designer 104 may act as a portal for custom applications to be loaded into the system 100. For example, the application designer 104 may receive executable programming code, which may be transferred to the design server 16 for compiling into an application. In other embodiments, the application designer 104 may receive applications created outside of the system 100, which may be deployed into the network 12 via the system 100. It will be appreciated that the application designer 104 may provide a variety of environments for creating customized applications for deploying into the network 12.

The catalog 106 may provide access to one or more extensibility applications, for example, one or more custom applications created using the application designer 104 and/or applications created by the device 14 manufacturer, vendors, and the like, as will be described in greater detail below. In some embodiments, the catalog 106 may store a copy of the extensibility applications on the system 100, for example, in a suitable database stored on a memory system of or accessible to the system 100. In other embodiments, the catalog 106 may store references (e.g., URLs) to instances of the extensibility applications stored elsewhere, as will be described in greater detail below. Further, the catalog 106 may communicate with the application designer 104 and/or the design server 16, such that applications designed in the application designer 104 may be loaded into or otherwise recognized by the catalog 106. The catalog 106 may communicate with the user interface 102 to display a listing of the applications available on the system 100 and/or those available for downloading to the system 100.

The catalog 106 may also communicate with the server 18, which may be a "catalog" server 18. The catalog server 18 may include an application database 28; however, in other embodiments, the application database 28 may be distributed among several computing devices, servers, etc., e.g., as part of a peer-to-peer network. The application database 28 may store a variety of applications, e.g., applications created by the manufacturer of the system 100, one or more of the devices 14, third-party vendors, etc. This may be referred to as an "application store." Accordingly, the catalog 106 may receive a listing of applications stored in the application database 28 from the catalog server 18. The catalog 106 may then display all or a part of the listing in the user interface 102. Further, the catalog 106 may store rules associated with the applications, for example, price, distribution limitations, etc. Thus, the catalog 106 may display both applications to which the system 100 has access, and applications that the system 100 may be able to add access to (e.g., by authorization after payment).

The catalog 106 may also communicate with the server 20, which may be a "license" server 20 configured to manage, request, and/or provide software licenses. The license server 20 may store information regarding types and numbers of licenses purchased or otherwise provisioned for a particular system 100 or network 12. Thus, the catalog 106 may query the status of licenses from the license server 20 and display information regarding such licenses on the user interface 102. Furthermore, when an application is selected by the user at the user interface 102, the catalog 106 may determine if a license is required for the new application and request one via the license server 20. The license server 20 may include predetermined rules for providing licenses, and may interface with the system 100 via the catalog 106 to provide the licenses.

The device manager 108 may communicate with the devices 14 of the network 12, for example, via a data transfer system or "unit" 110. The device manager 108 may automatically discover the devices 14 on the network 12, for example, via a network management protocol, e.g., Simple Network Management Protocol (SNMP), Web Services Dynamic Discovery (WS-discovery) or the like. Further, the device manager 108 may communicate with the user interface 102 to display device status and/or recognition to the user and allow selection of one or more of the devices 14.

The device manager 108 may also receive input from the user via the user interface 102. For example, the device manager 108 may receive input indicating a selection of one or more of the devices 14, and, in turn, cause the user interface 102 to display additional information (e.g., status, operating parameters, applications previously loaded on the selected device 14, etc.) of the selected devices 14. Additionally, the system 100 may allow the user to deploy applications from the catalog 106 to one or more, e.g., groups, or all of the devices 14 selected in the user interface 102 via the device manager 108.

Further, the data transfer system 110 may provide for communication between the system 100 and the devices 14 and/or with the network 12 via the Enterprise Information Portal, via a TCP/IP, SOAP-over-UDP connection, or any other communication or networking protocol. In an example, the data transfer system 110 may interact with the user interface 102 as a browser plug in. In an embodiment, the data transfer system 110 may employ ActiveX.

The data transfer system 110 may also provide for sending data (e.g., applications) to one or more of the devices 14 from the system. For example, the data transfer system 110 may allow the system 100 to target specific devices 14 and/or groups of devices 14 for deployment of applications from the catalog 106. Additionally, the data transfer system 110 may harvest information about the devices 14 therefrom, for example, device serial numbers, network addresses, operating system, hardware profiles, and the like, which may be employed for device identification e.g., for software licensing purposes, configuration, and/or selection of appropriate or compatible software.

Accordingly, in operation, the system 100 may provide an integrated extensibility environment and device management platform, while restricting access to extensibility applications on the devices 14. The user interface 102 may allow a user of the system 100 to manipulate the application designer 104, catalog 106, and/or device manager 108, so as to cause these components to conduct one or more operations. The system 100 may allow loading customized applications developed via the application designer 104 and/or applications purchased from third-party vendors to be loaded into the catalog 106 of the system 100. The device manager 108 may allow discovery and access to individual and/or groups of devices 14 in the network 12 via the data transfer system 110. Further, the system 100 may provide for deploying applications from the catalog 106 to the devices 14, e.g., without requiring the individual devices 14 to access the catalog 106, the application database 28, or servers 16-20 outside the network 12, thereby limiting security risks while allowing extensibility. As such, tight control of the applications available to the devices 14, for example, beyond merely attempting to restrict what may be loaded onto the devices 14 (e.g., by implementing device rights, etc.), may be implemented.

Such deployment may proceed by the system 100 sending a URL or other type of reference to a location where the device 14 may download the application. The system 100 may then instruct the device 14 to automatically download the application from the location or may alert a user that an application is prepared for downloading. In other embodiments, such deployment may proceed by the system 100 sending the actual executable application to the device 14 and causing the device to load (e.g., including installing) the application.

In various situations, one or more of the devices 14 in the network 12 may be economy or legacy devices, e.g., lacking certain hardware, operating systems, extensibility options, etc. Accordingly, accessing one catalog for all of the devices 14 may present difficulties for such a network 12. However, the system 100 may obviate such difficulties by transferring the extensibility applications without requiring the devices 14 to access any server or application store. Furthermore, the device manager 108 may allow the system 100 to recognize the different capabilities of the various devices 14. As such, the system 100 may allow selection of devices 14 with common relevant capabilities for different versions of a particular application, commensurate with those identified relevant capabilities. In other cases, the system 100 may allow for an identification of the capabilities of the least-capable device 14 (i.e., the lowest common denominator) and allow the user and/or the system 100 to automatically select versions of applications suitable for use in all of the devices 14. Accordingly, the system 100 may provide or otherwise ensure compatibility for the deployed applications 212 and the devices 14.

Moreover, the system 100 may facilitate extensibility while retaining effective use of the firewall 22. The firewall 22 may protect the devices 14 from connections with devices outside the network 12, i.e., between the network side 24 and the external side 26. The system 100 may communicate with the servers 16-20, and thereby act as an intermediary between the servers 16-20 and the devices 14.

In another embodiment, the device 14 may validate the presence of a license, register, etc. with the license server 20. Thus, the system 100 may harvest the identifying information for each of the devices 14 to which the application is or is to be deployed and report this information to the license server 20, such that the system 100 acts as an intermediary. In another embodiment, the devices 14 may directly link with the license server 20 to provision the required license, as indicated by dashed line 120.

Figure 2:
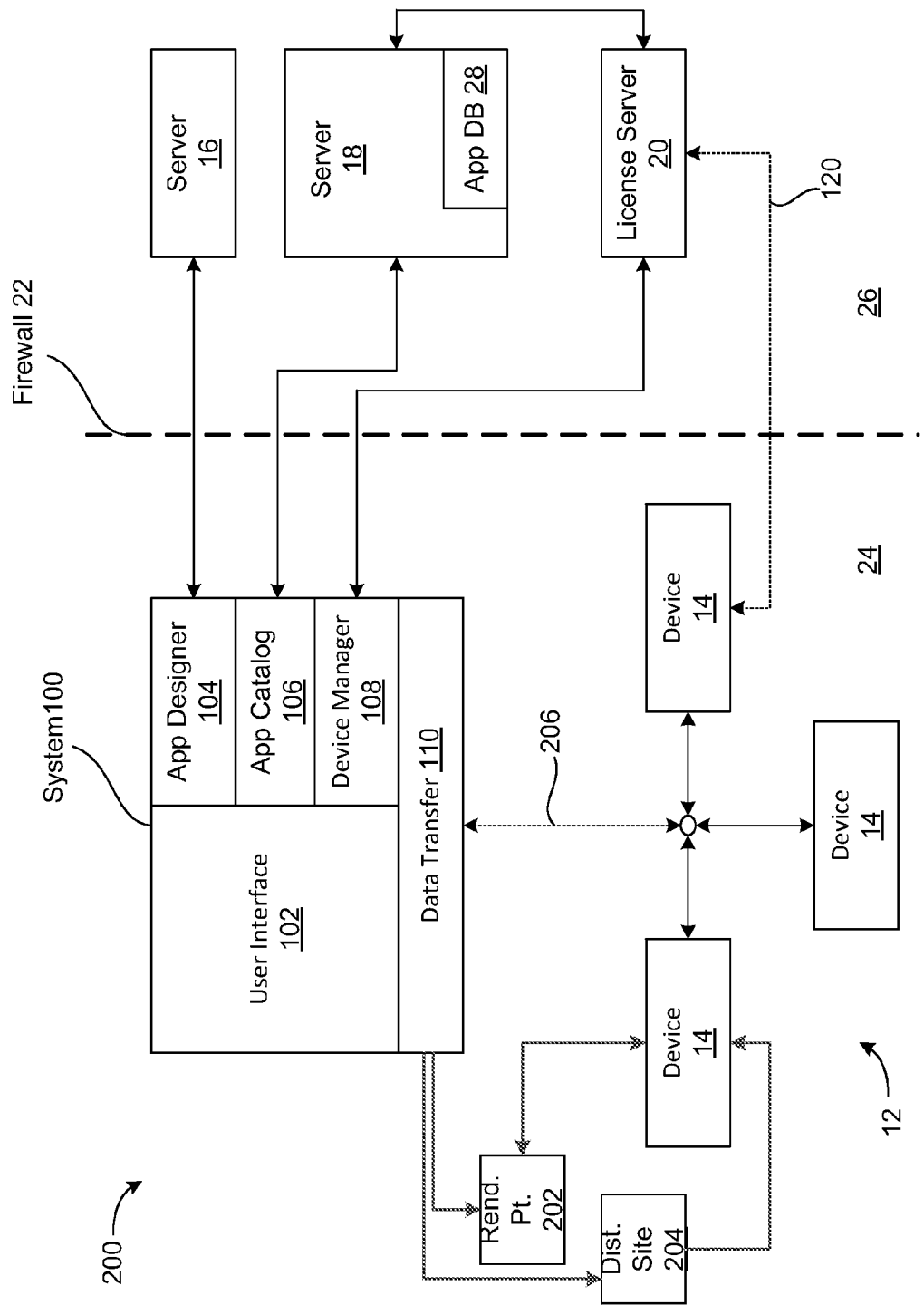
FIG. 2 illustrates a conceptual schematic view of another network environment including the integrated extensibility management system, according to an embodiment.

FIG. 2 illustrates another network environment 200, according to an embodiment. The network environments 10 (FIG. 1) and 200 may be similar and may include several like components; accordingly, such like components are given like reference numbers and are not described in duplicate herein. The network environment 200 may include a rendezvous point 202, which may be on the network side 24 of the firewall 22. The system 100 may access the rendezvous point 202. In one example, the system 100 may store data on the rendezvous point 202, indicating that applications are prepared for deployment to the devices 14. The system 100 may also load the applications prepared for deployment onto the rendezvous point 202, such that the rendezvous point 202 may serve as an additional layer of separation between the servers 16-20 and the devices 14, and may limit or avoid the devices 14 accessing the catalog 106 of the system 100.

Accordingly, the devices 14 may download the applications directly from the rendezvous point 202. In other embodiments, the rendezvous point 202 may indicate to the devices 14 that applications are prepared for deployment from the system 100, and then devices 14 may proceed to requesting and/or downloading the applications from the system 100, e.g., from the catalog 106. Thus, the devices 14 may include a schedule for when to poll the rendezvous point 202 for an indication that new applications are available.

In an embodiment, the network environment 200 may also include a distribution site 204, to which the system 100 may load applications for deployment to the devices 14. The system 100 may signal to the devices 14, e.g., via direct communication or through indicating at the rendezvous point 202 that one or more applications are available at the distribution site 204. In various embodiments, the distribution site 204 may be located on the catalog server 18, on the system 100, at another computer on the network side 24 of the firewall 22, at another server on the external side 26 of the firewall 22, or on one of the devices 14 of the network 12 (e.g., for peer-to-peer deployment). In one specific embodiment, the distribution site 204 may be co-located with the rendezvous point 202, such that the devices 14 may poll the rendezvous point 202 for the availability of new applications to load, and then download the applications from the same location. These examples are just a few among many contemplated, which will be readily apparent to one of ordinary skill in the art with the aid of the present disclosure. Further, as indicated by the dashed line 206 between the data transfer system 110 and the network 12, in cases where a distribution site 204 is provided, the system 100 may or may not be configured to communicate directly with the devices 14, and may instead deploy the applications via use of the rendezvous point 202 and the distribution site 204.

Figure 3:
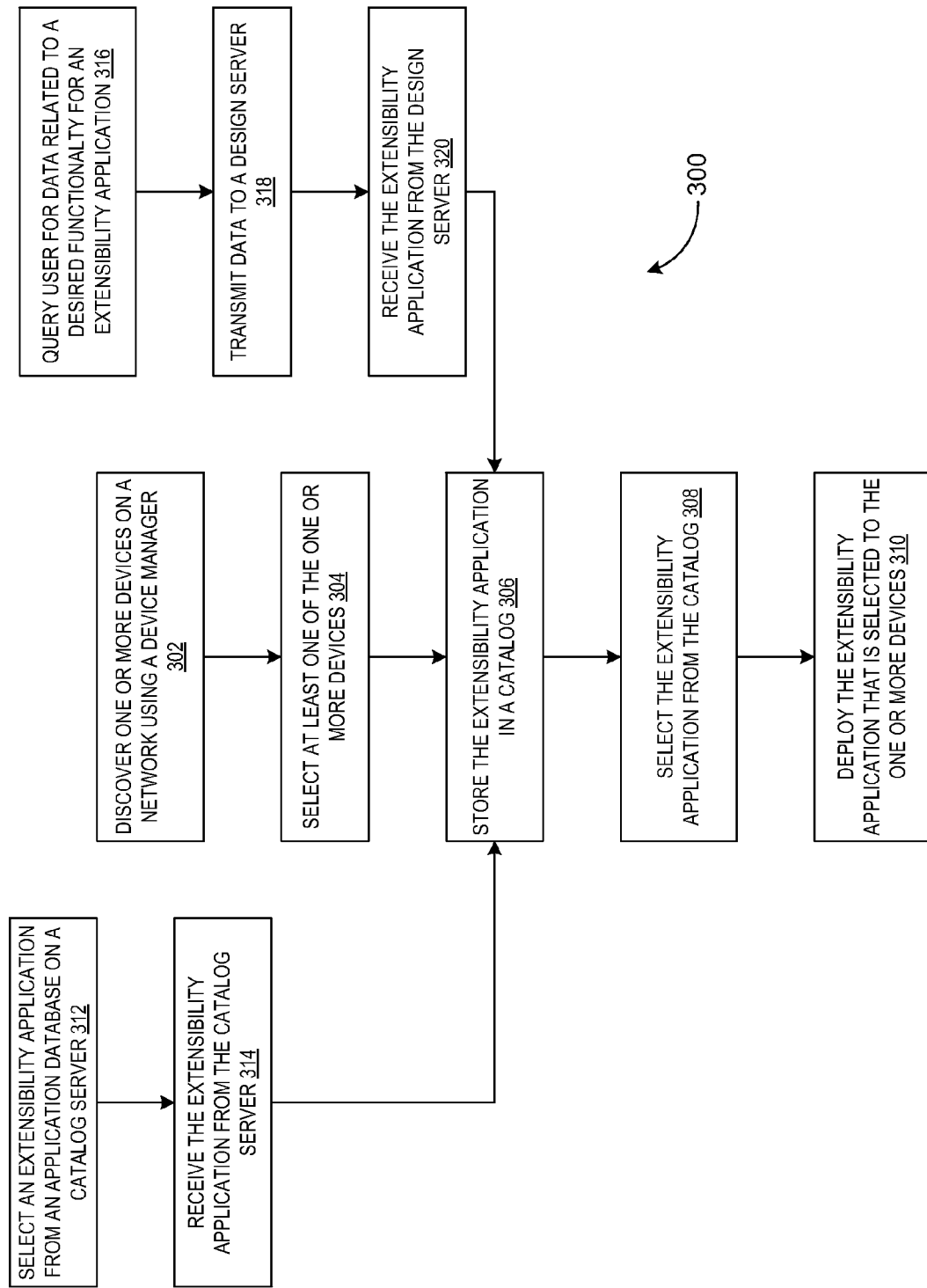
FIG. 3 illustrates a flowchart of a method for managing extensibility application deployment, according to an embodiment.

FIG. 3 illustrates a flowchart of a method 300 for managing extensibility application deployment, according to an embodiment. For example, the method 300 may include employing one or more embodiments of the system 100 and/or network environment 10 and/or 200, and may thus be best understood with reference thereto. However, it will be appreciated that the method 300 is not necessarily limited to any particular structure.

The method 300 may begin by communicating with the network, e.g., discovering one or more devices 14 on the network 12 using the device manager 108, as at 302. Such discovery at 302 may be automatic, according to one or more network device discovery protocols, but in other embodiments, may be manual.

Further, the method 300 may include selecting at least one of the one or more devices 14 using a user interface 102 communicating with the device manager 108, as at 304. For example, the user may select one or more devices 14, groups of devices 14, or all of the devices 14 using the device manager 108.

The method 300 may also include storing an extensibility application in the catalog 106, as at 306. The extensibility application may be received from one of two or more locations, as will be described below. Further, the catalog 106 may include a catalog database, which may store the application thereon. In some cases, the catalog database of the catalog 106 may store a plurality of extensibility applications, for example, all applications currently loaded onto one or more of the devices 14, or prepared for loading thereto. In other embodiments, the catalog database of the catalog 106 may delete instances of the applications after deploying.

The method 300 may then proceed to selecting the extensibility application from the catalog 106, as at 308. Accordingly, the method 300 may include the user interacting with the catalog 106 to select one or more applications that have been loaded to the catalog database (i.e., after causing the catalog 106 to acquire the application from the catalog server 18 and/or from the application designer 104). Once loaded into the catalog 106 and selected for deployment, the system 100 may be characterized as being prepared to deploy the application. Thereafter, the method 300 may proceed to deploying the extensibility application that is selected, for example, using the data transfer system 110, to the one or more devices 14, as at 310. Deploying may take the form of transferring an executable application for installation on the device 14, or providing a link to an installation site that the device 14 is caused to access. In some embodiments, such installation may not require local permission or other acquiescence of the device 14 or an operator thereof.

In an embodiment, the network environment 10 and/or 200 may include the catalog server 18, which may be remote with respect to the catalog 106, the devices 14, or both. The catalog server 18 may contain at least some of the extensibility applications, for example, as an "application store." The system 100 may interact with the catalog server 18 to display all or some of the applications available on the catalog server 18, and may partition the display available applications according to categories, subject matter, etc. The user of the system 100 may interact with the user interface 102 or otherwise cause the system 100 to select and request an application from the catalog server 18, as at 312. Thereafter, if any payment, compatibility, authorization, proof of licensing, etc. predicates are met, the catalog server 18 may transmit and the system 100 may receive the extensibility application from the catalog server 18, as at 314. In an embodiment, the system 100, the devices 14, and/or the catalog server 18, may interface with the license server 20 to acquire and/or prove licenses. Once received, the extensibility application may be stored in the catalog 106 at 306, as noted above.

In an embodiment, the system 100 may provide the application designer 104, as described above. In such cases, the method 300 may thus additionally include providing a development environment for a user of the system 100 to develop one or more custom extensibility applications. The application designer 104 may be provided as a portal for loading or coding such applications. However, in other embodiments, the application designer 104 may provide a non-technical user-friendly environment for quickly producing customized applications. As such, the method 300 may further include querying, using the application designer 104 communicating with the user interface 102, a user for data related to a desired function (e.g., scan to a particular location, perform optical character recognition while scanning, scan and print to a selected location, email to a specific location, etc.) of a custom extensibility application, as at 316.

The method 300 may then proceed to transmitting the data from the application designer 104 to the design server 16, as at 318. The design server 16 may translate the query responses into an executable application. Thereafter, the system 100 may receive into the catalog 106 the application created by the design server 16, as at 320.

Additionally, in some cases, management of licenses and/or maintaining a record of hardware and/or operating system capabilities, etc. may be provided by the catalog server 18 or as part of the system 100, so as to facilitate and/or enable loading of the applications from the catalog server 18 to the devices 14 via the system 100. Accordingly, the method 300 may also include harvesting data from the one or more of the devices 14. Such data may include compatibility data, hardware data, capability data, identification data, or a combination thereof. Thereafter, selecting the extensibility application at 308 from the catalog server 18 may include using the harvested data, for example, to select an extensibility application optimized for or otherwise within the capabilities of the hardware, compatible with the device 14, and/or the like. Further, selecting the extensibility application at 308 may include acquiring a license from the license server 20 using the data, e.g., to establish an identity of the device 14 to which the application is being loaded and acquire a license therefor.

As noted above, the network environment 200 may also include the rendezvous point 202 and/or the distribution site 204 (FIG. 2). Accordingly, in an embodiment, deploying the application at 310, may include sending data indicative of the system 100 having the extensibility application prepared for deployment to the rendezvous point 202. The one or more devices 14 may be configured to poll the rendezvous point 202, i.e., interrogate the rendezvous point 202 to determine if the system 100 has indicated to it that one or more applications are prepared for deployment. Using the rendezvous point 202 may, for example, facilitate batch downloading of multiple extensibility applications to the devices 14. Moreover, deploying at 310 may further include loading the extensibility application to the distribution site 204, with the one or more devices 14 accessing the distribution site 204 in response to the rendezvous point 202 indicating that the management system 100 has one or more extensibility application(s) prepared for deployment.

Figure 4:
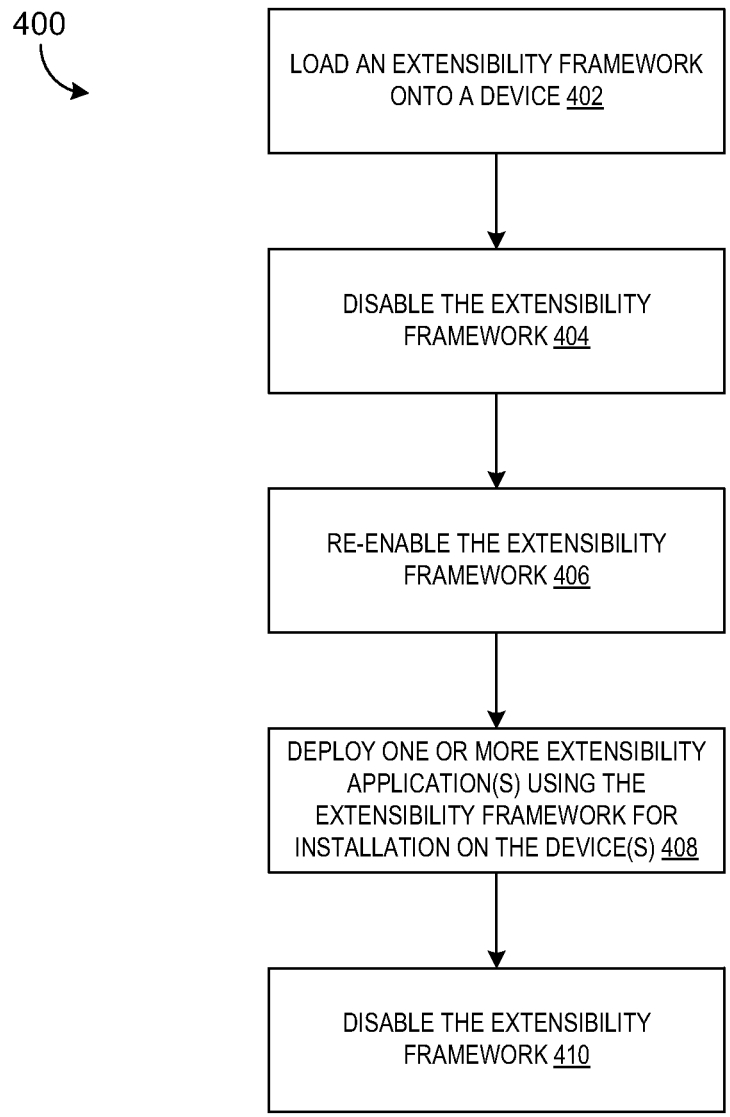
FIG. 4 illustrates a flowchart of a method for deploying an extensibility application, according to an embodiment.

In some cases, the extensibility framework of the devices 14 may be disabled prior to shipment of the devices 14. This may mitigate security risks associated with the remote location of the devices 14. The system 100 may, however, provide for extensibility in such cases. FIG. 4 illustrates a flowchart of an embodiment of a method 400 for deploying an extensibility application, e.g., using an embodiment of the system 100. The method 400 may be best understood with reference to the network environments 10 and/or 200 discussed above, but is not limited thereto unless otherwise expressly indicated herein.

The method 400 may begin by loading an extensibility framework onto the device 14, for example, prior to shipping the device 14, as at 402. One example of such an extensibility framework is the XEROX® Extensible Interface Platform (EIP), commercially-available from the Xerox Corporation (Norwalk, Conn., USA). Such extensibility frameworks may allow for automation of certain tasks by creating and/or employing extensibility applications to conduct routines. The method 400 may also include disabling the extensibility framework on the device 14, as at 404. By disabling the extensibility framework at 404, the extensibility framework may be rendered inoperative or otherwise unusable by local users of the device 14 and/or another computer coupled therewith. The devices 14 may be shipped and connected to the network 12 and thus may have communication capabilities that are not disabled; however, modifying the device 14, e.g., by loading extensibility applications (e.g., via the XEROX® EIP), may be disabled.

Once the device(s) 14 are deployed and, for example, connected to the network 12, the method 400 may include automatically re-enabling the extensibility framework, on demand, using the system 100, as at 406. The re-enabling of the extensibility framework may be indicated on a display of the device 14, or may conducted in the background, such that no or minimal outward signaling that the extensibility framework is re-enabled is apparent at the device 14. Such re-enabling may not require local permission or other acquiescence from the device 14 or an operator thereof. Further, such re-enabling may be conducted remotely, without requiring physical interaction with the local device 14 and may be conducted on multiple devices 14 concurrently.

The method 400 may then proceed to deploying one or more extensibility applications to the device 14, as at 408. The extensibility applications may be custom designed using the application designer 104 of the system 100, or may be loaded from an external database, e.g. over the internet, over a distributed cloud computing environment, or in any other manner. Further, the method 400 may include using the extensibility framework, i.e., the application installation capabilities thereof to facilitate installation of the extensibility application on the device 14. For example, the system 100 may be provided with administrator credentials and may be configured to access the device 14 using a network protocol such as SMNP. The system 100 may enable the extensibility framework of the device 14, install any extensibility applications, and then disable the framework. Further, this may be accomplished without any external indication that the extensibility framework is temporarily enabled.

Once the extensibility application is loaded onto the device 14, the extensibility framework of the device 14 may be disabled again, as at 410, thereby protecting the device 14 from modifications. Thus, the method 400 may minimize the frequency and/or duration during which extensibility features are enabled. Thus, the method 400 may enable the system 100 to employ an existing extensibility framework of the devices 14, even if such extensibility framework has been disabled to preclude local users from manipulating the device 14.

Accordingly, it will be appreciated that the above-described system 100 provides an integrated extensibility platform that provides a suite of functions, including application development and downloading, deployment, and device management. Furthermore, the presently-disclosed system 100 may reduce compatibility issues by avoiding, in some cases, any requirement for a catalog (or "application store") to be loaded onto the local device 14. Moreover, the system 100 may mitigate security risks, e.g., by facilitating effective use of the firewall 22 and/or by implementing one or more embodiments of the method 400 so as to selectively disable and enable extensibility features. It will be appreciated, however, that various systems 100 may include subsets of the full suite of features described herein. For example, in some implementations, an application designer 104 may not be needed and may thus be omitted.

Figure 5:
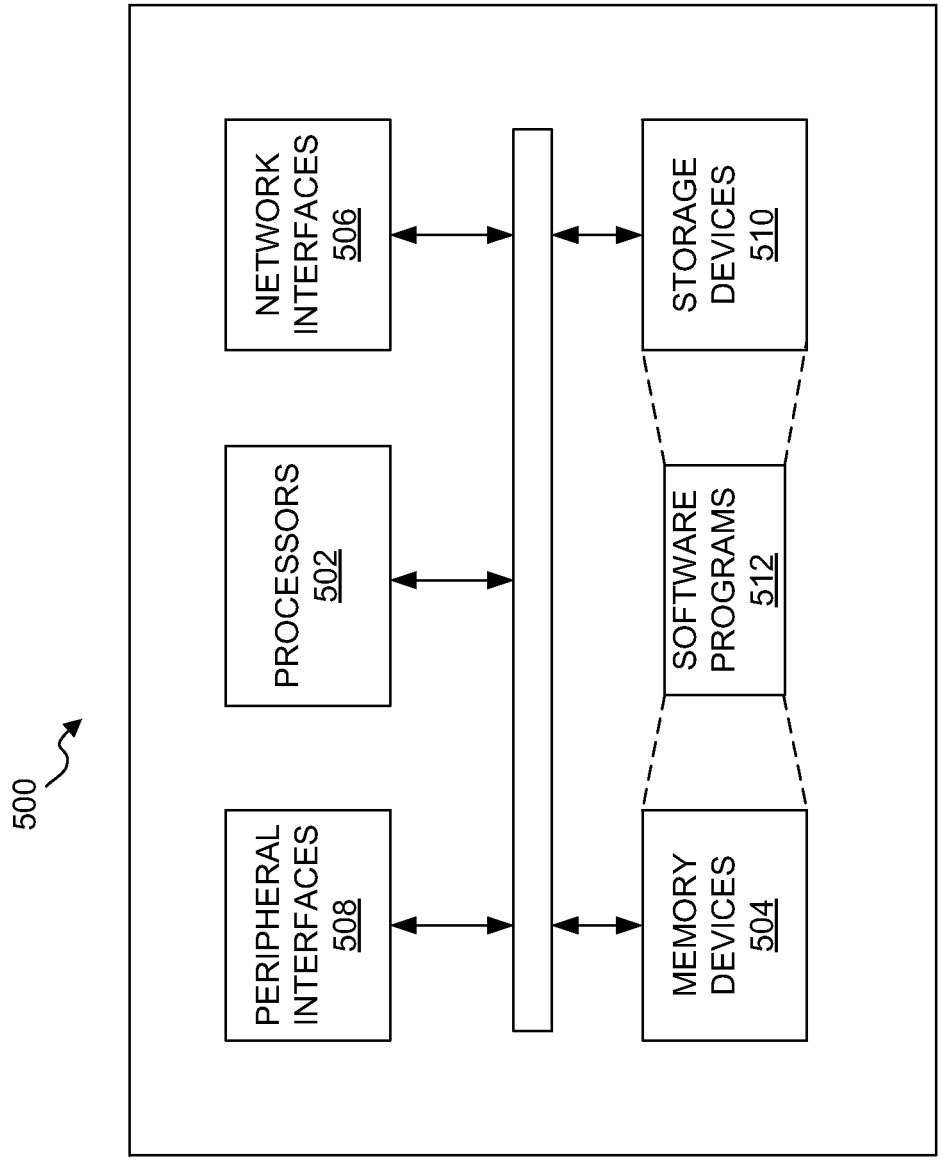
FIG. 5 illustrates a conceptual schematic view of a processing system, according to an embodiment.

Embodiments of the disclosure may also include one or more processor (i.e., computing) systems which may be implemented by the system 100, portions thereof, or partially implemented one or more processor systems. FIG. 5 illustrates a schematic view of such a processor system 500, according to an embodiment. The processor system 500 may include one or more processors 502 of varying core (including multiple core) configurations and clock frequencies. The one or more processors 502 may be operable to execute instructions, apply logic, etc. It will be appreciated that these functions may be provided by multiple processors or multiple cores on a single chip operating in parallel and/or communicably linked together. In one embodiment, the system 100 may include a single processor 502 configured to perform each function associated with the user interface 102, the application designer 104, the catalog 106, the device manager 108, and one or more operations associated with the data transmission system 110; however, in other embodiments, one, some, or each of these may be associated with distinct processors 502.

The processor system 500 may also include a memory system, which may be or include one or more memory devices and/or computer-readable media 504 of varying physical dimensions, accessibility, storage capacities, etc. such as flash drives, hard drives, disks, random access memory, etc., for storing data, such as images, files, and program instructions for execution by the processor 502. In an embodiment, the computer-readable media 504 may store instructions that, when executed by the processor 502, are configured to cause the processor system 500 to perform operations. For example, execution of such instructions may cause the processor system 500 to implement one or more portions and/or embodiments of the methods 300 and/or 400 described above and/or provide one or more of the with the user interface 102, the application designer 104, the catalog 106, the device manager 108, and/or one or more operations associated with the data transfer system 110.

The processor system 500 may also include one or more network interfaces 508, which may, in an embodiment, carry out the communication between the system 100 and the servers 16-20 and/or the devices 14. The network interfaces 508 may include any hardware, applications, and/or other software. Accordingly, the network interfaces 508 may include Ethernet adapters, wireless transceivers, PCI interfaces, and/or serial network components, for communicating over wired or wireless media using protocols, such as Ethernet, wireless Ethernet, etc.

The processor system 500 may further include one or more peripheral interfaces 506, for communication with a display screen, projector, keyboards, mice, touchpads, sensors, other types of input and/or output peripherals, and/or the like. In some implementations, the components of processor system 500 need not be enclosed within a single enclosure or even located in close proximity to one another, but in other implementations, the components and/or others may be provided in a single enclosure.

The memory device 504 may be physically or logically arranged or configured to store data on one or more storage devices 510. The storage device 510 may include one or more file systems or databases in any suitable format. The storage device 510 may also include one or more software programs 512, which may contain interpretable or executable instructions for performing one or more of the disclosed processes. When requested by the processor 502, one or more of the software programs 512, or a portion thereof, may be loaded from the storage devices 510 to the memory devices 504 for execution by the processor 502.

Those skilled in the art will appreciate that the above-described componentry is merely one example of a hardware configuration, as the processor system 500 may include any type of hardware components, including any necessary accompanying firmware or software, for performing the disclosed implementations. The processor system 500 may also be implemented in part or in whole by electronic circuit components or processors, such as application-specific integrated circuits (ASICs) or field-programmable gate arrays (FPGAs).

The foregoing description of several possible embodiments has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 500 may be used to execute programs according to instructions received from another program or from another computing system altogether. Similarly, commands may be received, executed, and their output returned entirely within the processing and/or memory of the processor system 500. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An integrated extensibility management system, comprising:
   at least one processor;
   a memory operably coupled to the at least one processor and operable to store instructions to be executed by the at least one processor;
   an application catalog in communication with an application database of a catalog server and configured to load applications therefrom;
   a device manager configured to discover one or more devices on a network and to allow selection of one or more selected devices from among the one or more devices;
   an application designer integrated with the application catalog and the device manager, wherein the application designer is configured to cause new applications to be created and located into the application catalog;
   a data transfer system in communication with the one or more devices and configured to cause an application to be transmitted from the application catalog to the one or more selected devices, wherein the one or more selected devices do not communicate directly with the application database;
   a display; and
   a user interface configured to communicate with a user via the display, the user interface integrating the application designer, the application catalog, and the device manager for manipulation by a user,
   wherein the application catalog is disposed on a protected said of a firewall and the application database is disposed on an external side of the firewall, wherein the one or more devices are prevented from communicating across the firewall.

2. The system of claim 1, wherein the application catalog is in communication with an application store at least partially contained on the catalog server, wherein the one or more devices are prevented from accessing the application store.

3. The system of claim 1, wherein the application designer is configured to query a user via the user interface for responses, and wherein the application designer is configured to communicated with a design server to generate an application based on the responses.

4. The system of claim 1, wherein the device manager is configured to enable an extensibility framework of at least one of the one or more devices on demand, to deploy the application thereto, and to disable the extensibility framework after deploying the application.

5. The system of claim 1, wherein the device manager is configured to retrieve identifying information, capability information, compatibility information, or a combination thereof from the one or more devices.

6. The system of claim 1, wherein the one or more devices comprise one or more multi-function printing devices.

7. The system of claim 1, wherein the application database is remotely located with respect to the one or more devices.

8. A computer-implemented method for managing applications in multi-function devices, comprising:
   discovering one or more devices on a network using a device manager of a management system;
   selecting at least one of the one or more devices using a user interface of the management system, wherein the user interface communicates with the device manager;
   receiving an application from a catalog server using an application catalog of the management system, the application catalog in communication with an application database of a catalog server and configured to load applications therefrom;
   selecting the application from the application catalog of the management system via the user interface; and
   deploying the application that is selected to the one or more devices that is selected without requiring that the one or more devices to directly communicate with the catalog server,
   wherein the application catalog is disposed on a protected side of a firewall and the application database is disposed on an external side of the firewall, wherein the one or more devices are prevented from communicating across the firewall.

9. The method of claim 8, further comprising:
   querying, using an application designer of the management system, a user for data related to a function;
   transmitting the data from the application designer to a design server; and
   receiving, using the application catalog, a custom application from the design server configured to function according to the data, wherein deploying the application comprises deploying the custom application.

10. The method of claim 8, further comprising harvesting data comprising compatibility data, hardware data, capability data, identification data, or a combination thereof, from the one or more devices, wherein selecting the application from the catalog server comprises using the data.

11. The method of claim 10, further comprising acquiring a license from a license server using the data.

12. The method of claim 8, wherein deploying comprises sending data indicative of the management system having the application prepared for deployment to a rendezvous point, wherein the one or more devices are configured to poll the rendezvous point.

13. The method of claim 12, wherein deploying further comprises loading the application to a distribution site, wherein the one or more devices are configured to access the distribution site in response to the rendezvous point indicating that the management system has the application prepared for deployment.

14. The method of claim 8, further comprising:
   disabling an extensibility framework of at least one of the one or more devices;
   enabling the extensibility framework, using the management system, when the management system is prepared to deploy the extensibility framework;
   installing the application on the one or more devices using the extensibility framework of the one or more devices; and
   disabling the extensibility framework, using the management system, after deploying the application to the at least one of the one or more devices.

15. A computer-readable medium storing instructions that, when executed by a processor, are configured to cause a device management system to perform operations, comprising:
   discovering one or more devices on a network using a device manager of a management system;
   selecting at least one of the one or more devices using a user interface of the management system, wherein the user interface communicates with the device manager;
   receiving an application from a catalog server using an application catalog of the management system the application catalog in communication with an application database of a catalog server and configured to load applications therefrom;

selecting the application from the application catalog of the management system via the user interface; and deploying the application that is selected to the one or more devices that is selected without requiring that the one or more devices to directly communicate with the catalog server, wherein the application catalog is disposed on a protected side of a firewall and the application database is disposed on an external side of the wall, wherein the one or more devices are prevented from communicating across the firewall.

16. The computer-readable medium of claim 15, wherein the operations further comprise:

querying, using an application designer, a user for data related to a function;

transmitting the data from the application designer to a design server; and receiving, using the application catalog, a custom application from the design server configured to function according to the data, wherein deploying the application comprises deploying the custom application.

17. The computer-readable medium of claim 15, wherein the operations further comprise:

harvesting data comprising compatibility data, hardware data, capability data, identification data, or a combination thereof from the one or more devices; and selecting the application from the catalog server using the data, or acquiring a license from a license server using the data, or both.

* * * * *